Figure 1:
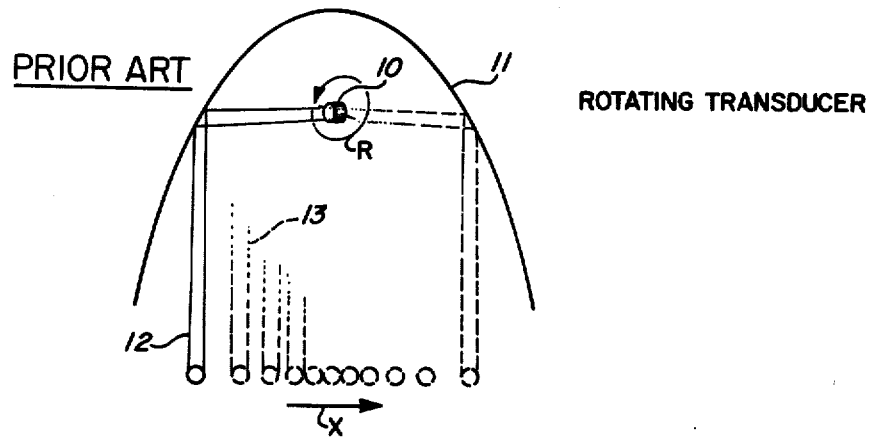
Figure 1:
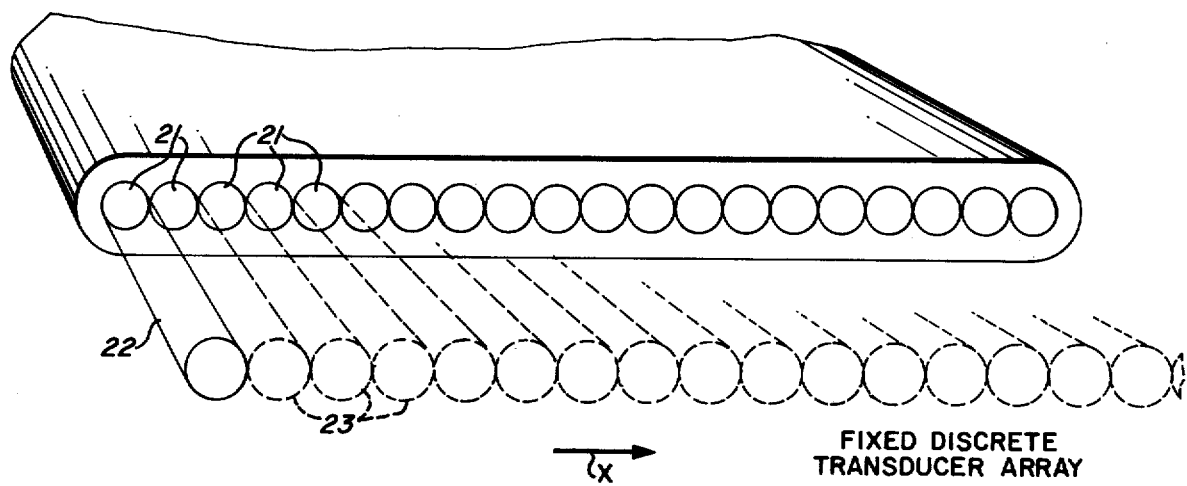
Figure 1:
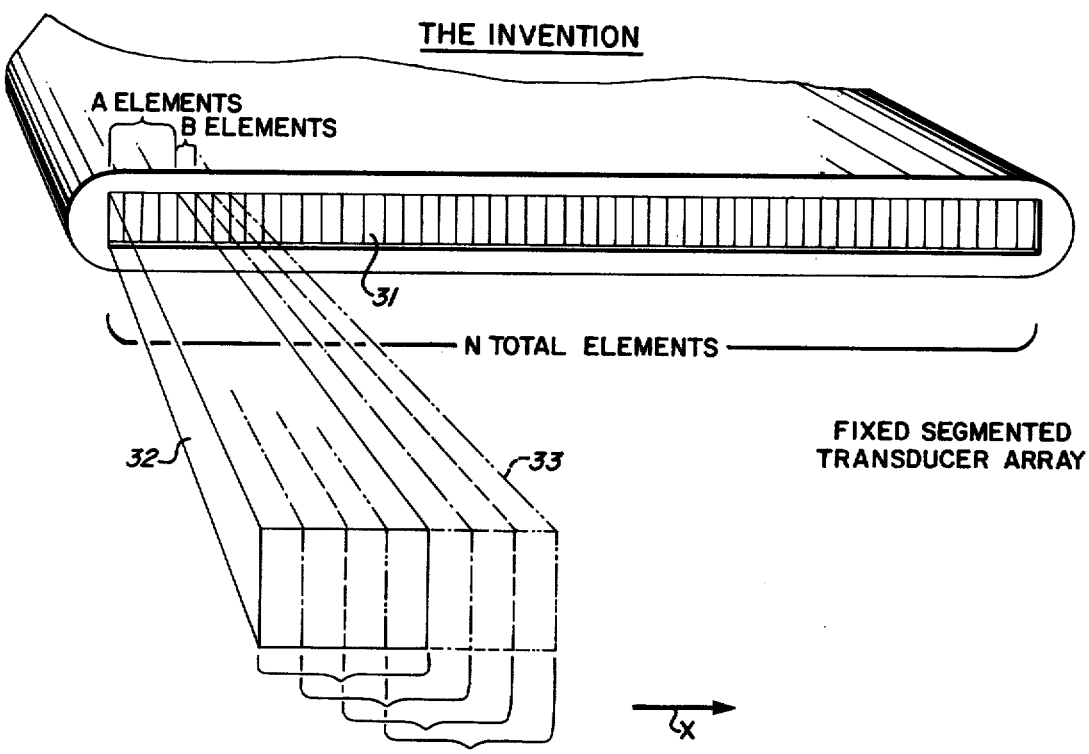

United States Patent [19]
Wilcox

[11] 3,881,466
[45] May 6, 1975

[54] ULTRASONIC CROSS-SECTIONAL IMAGING SYSTEM

[75] Inventor: Martin H. Wilcox, Franktown, Colo.

[73] Assignee: Advanced Diagnostic Research Corporation, Tempe, Ariz.

[22] Filed: Aug. 20, 1973

[21] Appl. No.: 389,958

[52] U.S. Cl. .......... 128/2 V; 128/2.05 Z; 73/67.8 S; 73/71.5 U; 340/5 MP
[51] Int. Cl. ............................................ A61b 10/00
[58] Field of Search .............. 128/2 V, 2.05 Z; 73/67.8 S, 71.5 U; 340/5 MP, 5 H

[56] References Cited
UNITED STATES PATENTS

| | | | |
|---|---|---|---|
| 2,700,895 | 2/1955 | Carson | 340/5 MP |
| 3,470,868 | 10/1969 | Krause et al. | 128/2 V |
| 3,693,415 | 9/1972 | Whittington | 73/67.8 S X |
| 3,778,756 | 12/1973 | Houston et al. | 340/5 MP |
| 3,789,833 | 2/1974 | Bom | 128/2 V |
| 3,805,596 | 4/1974 | Klahr | 73/67.8 S |

OTHER PUBLICATIONS

Bom, N., et al., Ultrasonics, Mar. 1972, pp. 72-76.

*Primary Examiner*—Kyle L. Howell
*Attorney, Agent, or Firm*—William H. Drummond; Gregory J. Nelson; Don J. Flickinger

[57] ABSTRACT

An improved ultrasonic cross-sectional imaging system includes an elongate segmented transducer array formed of N discrete transverse transducer elements. Counter-selector means are provided for transmitting a pulsed electrical signal to A selected adjacent transducer elements in the array, which groups (A elements each) are sequentially pulsed. Each succeeding group of A elements is displaced B elements along the elongate array. N, A and B are positive integers. N > A and N > B.

1 Claim, 2 Drawing Figures

PRIOR ART

ROTATING TRANSDUCER

FIXED DISCRETE TRANSDUCER ARRAY

THE INVENTION

FIXED SEGMENTED TRANSDUCER ARRAY

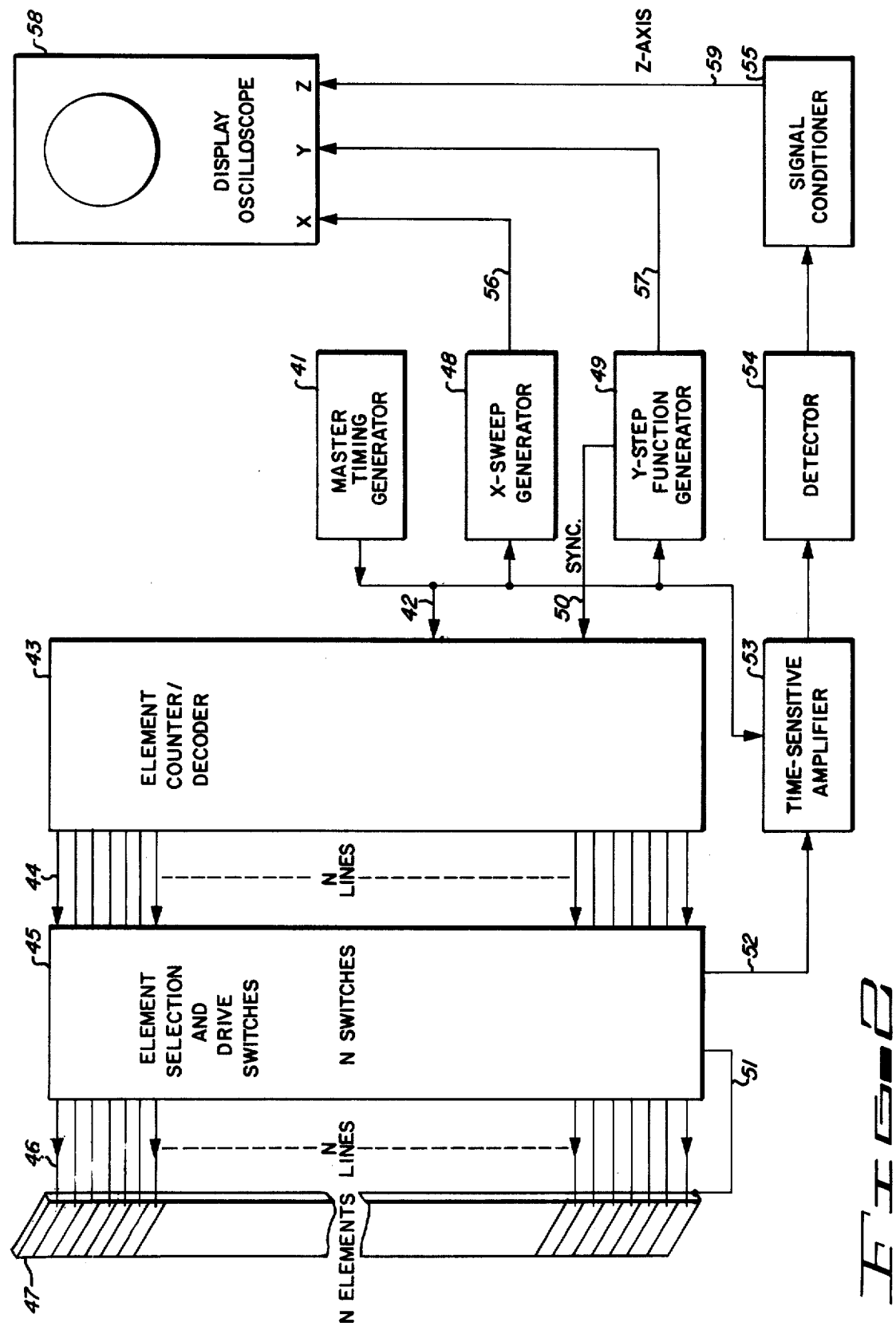

ULTRASONIC CROSS-SECTIONAL IMAGING SYSTEM

This invention pertains to imaging systems.

More particularly, the invention relates to so-called real-time ultrasonic imaging systems.

Specifically, the invention concerns systems for instantaneously and continuously producing visible representations of the cross-section of a heterogenous body having a moving discontinuity.

In a further and more particular respect, the invention provides an ultrasonic cross-sectional imaging system specially adapted for various medical applications, such as the non-invasive examination of moving cross-sections of anatomic structures.

In a further and even more specific and particular application, the invention makes possible the continuous and instantaneous examination of heart structures, such as the shape, size and thickness of ventricular walls, aortic walls, etc. This makes it possible to detect akenetic areas and thus help localize an infarct.

So-called "real-time" continuous imaging systems are known. Such systems have particular utility in medical applications because they make it possible to obtain both instantaneous and continuous representations or "images" of moving anatomic structures such as the heart.

An early real-time system employed an ultrasonic beam directed into the patient by means of a rotating transducer located at the focus of a parabolic sonic mirror. The entire transducer-reflector assembly was enclosed in a fluid-filled scanning head, one surface of which was covered by a plastic ultra-sonic "window" which was placed in contact with the patient. The mechanically swept beam of ultrasonic energy passed out of the head, through the window and into the patient. The reflected "echos" from the anatomic structure under examination passed back through the window to the transducer and were converted to corresponding electrical impulses which were subsequently displayed on an imaging screen, furnishing representations of the moving anatomic structure. This system described above had several limiting disadvantages. First, the long path length which is necessary when using a parabolic relfector limits the number of "frames" which can be displayed per second with a given scan length. Second, due to the non-linear horizontal sweep, the unit was not satisfactorily compatible with any recording technique other than cinematographic systems. Finally, the system suffered from the inherent unreliability of a rotating mechanical system.

More recently, an ultrasonic imaging system was developed which employs a fixed array of transducers mounted in a line on a movable "head." The head is pressed against the patient and an electronic switching system sequentially pulses and receives echos from each of the transducers in the array. The switching rate provides an imaging rate of 190 frames per second. Since the sweep is effectively linear, this system is compatible with line scan recorders and there are no mechanical problems such as those induced by the rotating transducer system. However, the lateral resolution of the fixed array system is limited by the center-to-center distance of the transducers which, in turn, is determined by the operating frequency and the desired beamwidth of each transducer. Within the physical limits imposed by the human body, the fixed array system will not permit a total picture of much more than twenty lines. The resulting image with this sort of resolution is very poor by any raster-imaging standard (commercial television, for example, has 525 lines).

It would be highly desirable, therefore, to develop a real-time ultrasonic imaging system which utilizes the advantages of a fixed transducer array, but which provides significantly improved lateral resolution.

Accordingly, it is the principal objective of the invention to provide an improved real-time ultrasonic system.

A further and more specific object of the invention is to provide an improved ultrasonic imaging system for instantaneously and continuously producing visible representations of the cross-section of a heterogenous body having a moving discontinuity.

Yet another object of the invention is to provide an ultrasonic cross-sectional imaging system specially adapted for various medical applications.

In particular, an important object of the invention is the provision of an ultrasonic imaging system particularly useful in the continuous and instantaneous examination of human heart structures.

These and other further and more specific objects and advantages of the invention will be apparent to those skilled in the art from the following detailed description thereof, taken in conjunction with the drawings, in which:

FIG. 1 is a comparison of the transducer portions of the prior art systems described above with the transducer portion of the present invention; and FIG. 2 is a schematic block diagram illustrating the presently preferred embodiment of the invention.

Briefly, the invention may be broadly described as an improvement of prior art real-time ultrasonic cross-sectional imaging systems which generally include time-generator means for generating a pulsed electrical signal, transducer means responsive to the electrical signal for transmitting a pulsed ultrasonic energy beam, receiving echos reflected from within a heterogenous body and generating an electrical signal in response to the echos received, and display means for converting the electrical echo signal to a continuous visible image representing the cross-sectional structure of the heterogenous body. By means of my improvement, the quality of the image is substantially improved in comparison to rotating transducer and fixed-array transducer systems. According to my invention, I provide transducer means consisting of a fixed segmented elongated array of N discrete adjacent transverse transducer elements and element counter-selector means for transmitting a pulsed electrical signal to A selected adjacent transducer elements and sequentially pulsing selected groups of A contiguous transducer elements, each of which are longitudinally displaced along said elongate array, each said group being displaced B elements from the location of the immediately preceding group. N, A and B are positive integers. $N > A$ and $N > B$.

Turning now to the drawings, FIG. 1 is presented to clarify the differences in physical structure and mode of operation of the prior art systems as compared with the system of the present invention. Referring to the rotating transducer system, as the transducer 10 located at the focus of a parabolic reflector 11 is rotated in the direction of the arrow R, the ultrasonic energy beam 12 is laterally displaced in the direction of the arrow X as represented by the series of dashed circles 13 which represent the instantaneous lateral position of the beam 12 at equal time intervals. Note that the position of the beam 12 is non-linear with respect to time.

Referring to the fixed discrete transducer array, each transducer element 21 is selectively and sequentially pulsed to generate an ultrasonic energy beam 22, which is displaced in the direction of the arrow X as represented by the series of dashed circles 23 which represent the instantaneous lateral position of the beam 22 at equal time intervals. Note that the position of the beam 22 is linear with respect to time.

Finally, referring to the fixed segmented transducer array utilized in accordance with the present invention, successive groups of A adjacent transducer elements 31 are sequentially pulsed. Each successive group of A elements is longitudinally displaced B elements from the location of the immediately preceding group. The beam of ultrasonic energy 32 is displaced in the direction of the arrow X as represented by the series of dashed rectangles 33 which represent the instantaneous lateral position of the beam 32 at equal time intervals. Note that the position of the beam 32 is linear with respect to time and that in comparison to the prior art systems, the lateral resolution is markedly increased, resulting in greatly improved image quality. Thus, the fixed array of N segmented transducers, pulsed in groups of A elements at a time, each group displaced B elements from the preceding group provides N-(A-1) effective transducers.

FIG. 2 is a block diagram of the components of the improved imaging system embodying the present invention. A master timing generator 41 generates a repetitive electrical timing pulse. The pulse signal is transmitted 42 to the element counter/decoder 43 and thence 44 to a bank of element selection-drive switches 45. The switches select the particular group of transducer elements to be energized and provide the excitation signal 46 to that particular group of elements located in the transducer array 47. The signal generated by the timing generator 41 also triggers the X-sweep generator 48 and the Y-step function generator 49. The Y step function generator 49 generates a sync signal 50 for the element counter/decoder 43. Echo signals 51 produced by the transducer elements 47 are sllected by the switches 45 and transmitted 52 to a time-sensitive amplifies 53 which compensates for attenuation of the signals due to scattering and absorption. A detector 54 modifies the signal from the time-sensitive amplifier for the logarithmic intensity modulation circuit of the signal conditioner 55. The sweep generator signal 56 and the step function generator signal 57 are applied respectively to the X and Y axis inputs of a display oscilloscope 58. The output signal 59 of the signal conditioner 55 is applied to the Z axis input of the display oscilloscope 58 and the lowest and highest echo signal amplitudes are displayed respectively as low and high intensity spots on the display oscilloscope screen.

The width of each transducer segment determines the lateral resolution of the system and the number of segments determines the number of lines in the display raster. For example, in a preferred embodiment of the invention, I employ an array composed of 64 segments (N=64) each ⅛inch wide by ½inch long, arranged side by side to form a rectangle ½inch wide by 8 inches long. The electronic switching circuitry which controls the pulse drive and receiver selection is arranged so that four segments in the array (effectively a transducer ½inch by ½inch square) are pulsed simultaneously and allowed to receive the returning echose (A=4). After a time sufficient that all return echos have ceased, the switching circuits disconnect the first segment of the group and connect the next adjacent segment in the array (B=1), leaving the second, third and fourth segments still connected to the pulser-receiver. In effect then, the ½inch by ½inch square transducer has been moved only ⅛inch laterally. This provides an improvement in lateral resolution four times greater than a system of discrete ½inch square transducers side by side which are sequentially pulsed. The transducer formed by the next group of 4 segments is then pulsed and the echos are received. In this manner, the entire array is scanned, producing 61 lines on the oscilloscope display tube.

Depending on the application of the system, more segments with proportionally improved lateral resolution may be used. Higher frequencies permit the use of more segments, since the returning echos die out in a shorter time, allowing the next group of segments to be pulsed more rapidly. Thus, the system of the present invention retains the advantage of the discrete transducer system but adds markedly increased lateral resolution with greatly improved image quality.

The exact size of the transducer elements utilized in constructing the segmented array contemplated by my invention is not critical. Selection of the size of the transducers will depend upon the end use of the imaging system. In general, the objective in selecting the size of the transducers is to use the smallest size possible to give the best possible lateral resolution. However, as the size of the transducer is reduced, beam spreading with consequent interference becomes a problem. The relation between size of the transducer (D — width or diameter), frequency of propagation of the sound wave, and velocity of the sound wave in the medium being investigated is $$\sin \theta = 1.22 \, \lambda/D,$$

where $\theta$ is the half-angle of divergence of the beam and $\lambda$ is the velocity of sound in the medium divided by the frequency of vibration of the sound wave. Knowing the distance from the transducer to the discontinuity, one can then calculate the beam diameter at the discontinuity. For example, the distance from the transducer to the rear wall of the heart in an average-sized patient will be approximately 15 cm and the average sound velocity in human tissue is 1538 m/sec. Using transducer elements 2.5 mm wide which operate at a frequency of 2.25 Mhz and pulsing four adjacent elements at a time (giving an effective transducer diameter of 10 mm), the half-angle of divergence will be 4.8°. This divergence half-angle is close to the maximum allowable for good cardiac resolution. For comparison, in the Bom unit, the transducer diameter is about 5 mm and the half-angle is 9.4°. This produces a beam diameter of 50 mm at a distance of 15 cm, leading to significant beam overlapping and distortion and producing a relatively indistinct image.

Having described my invention in such terms as to enable those skilled in the art to which it pertains to understand and practice it, and having identified the presently preferred embodiment thereof,

I Claim:

1. In a real-time ultrasonic cross-sectional imaging system, said system including timing generator means for generating a pulsed electrical signal, transducer means for generating a pulsed ultrasonic energy beam in response to said electrical signal, transmitting said pulsed ultrasonic beam into a heterogenous body, receiving echos reflected from a moving discontinuity in said body, and generating an electrical echo signal in response to said received echos, and display means for converting said echo signal to a continuous visible image representing the moving cross-sectional structure of said heterogenous body.

the improvement whereby the quality of said image is substantially improved in comparison to rotating transducer and fixed-array transducer systems, said improvement comprising:

a. said transducer means consisting of a fixed segmented elongated array formed of N discrete adjacent transverse transducer elements, said elements being large in comparison to the wave length of said pulsed ultrasonic energy beam;

b. element counter-selector means for 1. transmitting identical cophased pulsed electrical signals to A selected adjacent transducer elements to generate identical cophased pulsed ultrasonic energy beams, and 2. sequentially pulsing selected groups of A contiguous elements as in paragraph (b) (1), each of which groups are longitudinally displaced along said elongate array, each said group being displaced B elements from the location of the immediately preceding group;

N, A and B being positive integers and $N > A, N > B$.

* * * * *